US010590357B2

(12) United States Patent
Gaffney et al.

(10) Patent No.: US 10,590,357 B2
(45) Date of Patent: Mar. 17, 2020

(54) DIESEL FUEL COMPOSITION (71) Applicant: GAS TECHNOLOGIES L.L.C., Walloon Lake, MI (US)

(72) Inventors: Ian Lawrence Gaffney, Boyne Falls, MI (US); Evan Michael Visser, Boyne Falls, MI (US); Krishna K. Rao, The Woodlands, TX (US)

(73) Assignee: GAS TECHNOLOGIES L.L.C., Walloon Lake, MI (US)

( * ) Notice: Subject to any disclaimer, the term of this patent is extended or adjusted under 35 U.S.C. 154(b) by 0 days.

(21) Appl. No.: 15/428,506

(22) Filed: Feb. 9, 2017

(65) Prior Publication Data

US 2017/0145329 A1    May 25, 2017

Related U.S. Application Data (62) Division of application No. 14/503,979, filed on Oct. 1, 2014, now Pat. No. 9,587,189.

(Continued)

(51) Int. Cl.
*C10L 1/22* (2006.01)
*C10L 1/185* (2006.01)
*C10L 1/23* (2006.01)
*C10L 10/02* (2006.01)
*C10L 10/12* (2006.01)
(Continued)

(52) U.S. Cl.
CPC ............ *C10L 1/22* (2013.01); *C10L 1/026* (2013.01); *C10L 1/18* (2013.01); *C10L 1/1832* (2013.01); *C10L 1/1852* (2013.01); *C10L 1/231* (2013.01); *C10L 10/02* (2013.01); *C10L 10/12* (2013.01); *C10L 1/1824* (2013.01); *C10L 2200/0254* (2013.01); *C10L 2200/0259* (2013.01); *C10L 2200/04* (2013.01); *C10L 2270/026* (2013.01); *C10L 2290/08* (2013.01); *C10L 2290/24* (2013.01)

(58) Field of Classification Search
None
See application file for complete search history.

(56) References Cited

U.S. PATENT DOCUMENTS

| 2,004,714 A | 6/1935 | Thompson et al. |
| 2,130,080 A | 9/1938 | Evans |

(Continued)

FOREIGN PATENT DOCUMENTS

| EP | 0 407 038 B1 | 1/1995 |
| WO | 2008-135801 A2 | 11/2008 |

OTHER PUBLICATIONS

Kiernan, J.A. et al., "Formaldehyde, Formalin, Paraformaldehyde and Glutaraldehyde: What They Are and What They Do," Microscopy Today, 2000, pp. 8, 10, and 12 (pp. 9 and 11 omitted because they are advertisements).

(Continued)

*Primary Examiner* — Ellen M McAvoy
*Assistant Examiner* — Ming Cheung Po
(74) *Attorney, Agent, or Firm* — Brooks Kushman P.C.

(57) ABSTRACT

A diesel fuel substitute composition includes an alcohol, an acetal, and an additive comprising a component selected from the group consisting of $C_{3-8}$ dialkyl ethers, alkylated phenols, R—$NO_2$, and combinations thereof. A method for forming the diesel fuel substitute is also provided.

37 Claims, 2 Drawing Sheets

Related U.S. Application Data (60) Provisional application No. 61/885,320, filed on Oct. 1, 2013.

(51) Int. Cl.
*C10L 1/02* (2006.01)
*C10L 1/183* (2006.01)
*C10L 1/18* (2006.01)
*C10L 1/182* (2006.01)

(56) References Cited

U.S. PATENT DOCUMENTS

| | | | |
|---|---|---|---|
| 2,376,668 A | 5/1945 | Derby et al. | |
| 2,614,072 A * | 10/1952 | Carlson | C07C 45/84 |
| | | | 203/30 |
| 2,977,386 A | 3/1961 | Kise et al. | |
| 3,282,983 A | 11/1966 | Lachowicz et al. | |
| 4,065,421 A | 12/1977 | Allyn et al. | |
| 4,260,841 A * | 4/1981 | Holland | B01J 29/40 |
| | | | 518/728 |
| 4,276,055 A | 6/1981 | Huang | |
| 4,417,903 A | 11/1983 | Hinkamp | |
| 4,541,835 A | 9/1985 | Norton et al. | |
| 4,541,837 A | 9/1985 | Norton et al. | |
| 4,603,662 A | 8/1986 | Norton et al. | |
| 4,618,451 A | 10/1986 | Gent | |
| 4,760,210 A | 7/1988 | Sweeney | |
| 4,833,171 A | 5/1989 | Sweeney | |
| 5,177,114 A | 1/1993 | Van Dijk | |
| 5,520,710 A | 5/1996 | Olah | |
| 5,628,805 A | 5/1997 | Lif et al. | |
| 6,013,114 A | 1/2000 | Hille et al. | |
| 6,255,357 B1 | 7/2001 | Abbott | |
| 6,270,541 B1 | 8/2001 | Basu et al. | |
| 6,486,362 B1 | 11/2002 | Forestiere et al. | |
| 6,514,299 B1 | 2/2003 | Bean et al. | |
| 6,548,681 B1 | 4/2003 | Chopade et al. | |
| 6,599,336 B2 | 7/2003 | Hamada | |
| 6,824,574 B2 * | 11/2004 | O'Rear | C10L 1/026 |
| | | | 208/58 |
| 6,846,951 B1 | 1/2005 | Thiebaut | |
| 7,005,529 B2 | 2/2006 | Eek-Vancells | |
| 7,456,327 B2 | 11/2008 | Pawlak et al. | |
| 7,470,811 B2 | 12/2008 | Thiebaut | |
| 7,578,981 B2 | 8/2009 | Pawlak et al. | |
| 7,615,085 B2 | 11/2009 | Schwab et al. | |
| 7,642,293 B2 | 1/2010 | Pawlak et al. | |
| 7,687,669 B2 | 3/2010 | Pawlak et al. | |
| 7,846,978 B2 | 12/2010 | Olah et al. | |
| 7,879,296 B2 | 2/2011 | Pawlak et al. | |
| 7,910,787 B2 | 3/2011 | Pawlak et al. | |
| 8,148,589 B2 | 4/2012 | Gracey et al. | |
| 8,193,254 B2 | 6/2012 | Pawlak et al. | |
| 8,202,916 B2 | 6/2012 | Pawlak et al. | |
| 8,293,186 B2 | 10/2012 | Pawlak et al. | |
| 8,410,183 B2 | 4/2013 | Cortright et al. | |
| 9,174,903 B2 | 11/2015 | Rao et al. | |
| 9,255,051 B2 | 2/2016 | Gaffney et al. | |
| 9,587,189 B2 | 3/2017 | Gaffney et al. | |
| 2002/0026744 A1 | 3/2002 | Golubkov et al. | |
| 2006/0223892 A1 | 10/2006 | Pawlak et al. | |
| 2007/0100005 A1 | 5/2007 | Pawlak et al. | |
| 2007/0130822 A1 | 6/2007 | Araya | |
| 2009/0048468 A1 | 2/2009 | Varkiani et al. | |
| 2009/0069607 A1 | 3/2009 | Smith, Jr. et al. | |
| 2010/0041776 A1 | 2/2010 | Czernichowski et al. | |
| 2010/0158760 A1 | 6/2010 | Pawlak et al. | |
| 2010/0242347 A1 | 9/2010 | Eberhard | |
| 2011/0040129 A1 | 2/2011 | Loescher | |
| 2012/0142973 A1 | 6/2012 | Su et al. | |
| 2012/0232311 A1 | 9/2012 | Hsieh et al. | |
| 2013/0035519 A1 | 2/2013 | Lee et al. | |
| 2014/0275642 A1 | 9/2014 | Gaffney et al. | |
| 2014/0275643 A1 | 9/2014 | Rao et al. | |
| 2016/0031780 A1 | 2/2016 | Gaffney et al. | |
| 2016/0045890 A1 | 2/2016 | Rao et al. | |
| 2017/0320801 A1 | 11/2017 | Gaffney et al. | |

OTHER PUBLICATIONS

U.S. Appl. No. 15/660,149, filed Jul. 26, 2017, Gaffney et al., 12 pages.

International Search Report dated Jan. 8, 2015, PCT Appn. No. PCT/US2014/;058628 filed Jan. 1, 2014, 4 pgs.

International Search Report dated Jul. 2, 2014 in PCT/US2014/027256, filed Mar. 14, 2014, 6 pgs.

International Search Report dated Jul. 29, 2014 in PCT/US2014/028368, filed Mar. 14, 2014, 4 pgs.

International Search Report dated Aug. 22, 2014 in PCT/US2014/030161, filed Mar. 17, 2014, 4 pgs.

Nunan, J.G. et al, "Methanol and 2-Methyl-1-Propanol (Isobutanol) Coupling to Ethers and Dehydration over Nafion H: Selectivity, Kinetics, and Mechanism," J. of Catalysis 139, pp. 406-420 (1993).

Zhang, X. et al, "Synthesis of methylal by catalytic distillation," Chemical Engineering Research and Design 89, pp. 573-580 (2011).

* cited by examiner

DIESEL FUEL COMPOSITION

CROSS-REFERENCE TO RELATED APPLICATIONS

This application is a division of U.S. application Ser. No. 14/503,979 filed Oct. 1, 2014, now U.S. Pat. No. 9,587.189 issued Mar. 7, 2017, which, in turn, claims the benefit of U.S. provisional application Ser. No. 61/885,320 filed Oct. 1, 2013, the disclosures of which are hereby incorporated in their entirety by reference herein.

TECHNICAL FIELD

In at least one aspect, the present invention is related to substituent compositions for diesel fuel applications.

BACKGROUND

Low-cost conveniently synthesized fuels with diesel-like characteristics have been long sought. However, difficulties such as low lubricity, high volatility and low energy content have limited their adoption. The source for such alkanes can be natural gas, coal gas, biogas or from partial oxidation of chemical waste such as plastics.

Oxygenate blends rich in alcohols and aldehydes are produced by well-known methods such as the partial oxidation of alkanes. It is desirable to form a product capable of being utilized directly in a compression ignition engine from these mixtures, rather than undertake the more circuitous methanol olefins to gasoline and distillates (MOGD) approach for conversion of oxygenates to diesel. Moreover, the organic content of such a fuel product can be produced entirely from the blend with sufficient efficiency to be sold at a cost less than that of traditional diesel on an energy equivalent basis. Large diesel demands and scarce fuel supplies are typical of stranded areas where associated gas is flared so in the case of partial oxidation GTL processes this invention meets a critical need to minimize fuel transportation.

Although lower alcohols such as methanol and ethanol are typical of direct partial oxidation of alkanes, neat methanol is not a suitable fuel in compression ignition internal combustion engines as it has a low cetane number, meaning that it is difficult to self-ignite under compression and is therefore unsuitable for usage in a diesel engine. One solution is to react the aldehydes with the alcohols in situ to form acetals such as dimethoxy methane. Dimethoxymethane, synthesized from formaldehyde and methanol, is generally considered too volatile for use in diesel engines although it has suitable ignition characteristics for compression ignition engines. It also possesses unfavorable lubricity characteristics. A solution to this problem is to selectively form acetals by reacting alcohols with carbons greater than that of ethanol with formaldehyde and higher aldehydes. However, there is another significant problem encountered with such acetals. Although the alkoxy groups of formaldehyde dialkyl acetals, corresponding to the $C_n$ alkanols from which they were derived, where n is the carbon number from 2 to 4, have been shown to be very diesel like in terms of viscosity, cetane number, flash point, and lubricity, they are known to form peroxides. (Murphy, M., Safety and Industrial Issues Related to the Use of Oxygenates in Diesel Fuel. SAE technical paper 1999-01-1473, 1999). Diethoxy ethyl acetal, commonly known as acetal, is particularly prone to this problem.

Hydroperoxides tend to form at the CH bond adjacent to the oxygen of the alkoxy functionality of ethers and acetals. These ethers are particularly dangerous on the higher substituted carbons adjacent to the ether (Brown et al. Organic Chemistry 5 ed.). For example, diisopropyl ether, having tertiary substitution at this carbon site, has a history of dangerous explosions whereas dimethyl ether with only primary substitution at this carbon is generally not known for forming peroxides. Likewise, as previously mentioned, (1,1 diethoxy ethane) is known to possess significant risk for peroxide formation. So far this problem has not been addressed in regards for a purely oxygenated diesel fuel substitute.

U.S. Pat. No. 2,130,080 (the '080 patent) discloses a composition which inhibits the formation of peroxides on dialkyl ethers following exposure to atmospheric oxygen. The disclosed additive is a carbonyl group such as a ketone or carboxylic acid with aliphatic substituents. The specific peroxide inhibitors mentioned are acetone, methyl ethyl ketone, or salicylic acid. The '080 patent does not disclose the application of these inhibitors to inhibit peroxide formation on a fuel blend. Moreover, the '080 patent fails to teach the use of such compounds to inhibit peroxides on acetals.

U.S. Pat. Pub. No. 2007/0130822 discloses a biofuel composition containing dimethoxymethane, however, no claim is made of the use of higher acetals. Furthermore, no mention is made with regards to the tendency of some of the mentioned oxygenates to form dangerous peroxides, nor is the addition of additives with substantial antioxidant properties disclosed. In addition, many of the oxygenate additives are not readily synthesized from the products that result from direct partial oxidation, nor is direct partial oxidation mentioned as a source of such oxygenates.

U.S. Pat. No. 7,615,085 (the '085 patent) discloses a mixture of acetals and/or carbonates and/or esters to be blended with low sulfur diesel and an antioxidant additive to inhibit peroxide formation. The oxygenate disclosed therein is a trialkyl substituted carbon in the beta position to a polar group such as OH, aldehyde, ketone, nitro functionality. However, the '085 patent does not disclose the use of dialkyl acetals higher (in the sense of the number of carbons in the aldehyde or ketone) than dimethoxymethane. Furthermore, the '085 patent discloses blending of oxygenates at a concentration of 500 to 2500 parts per million of fuel (v/v). Alcohols and simple dialkyl ethers are not specified as being part of the oxygenated blend. Moreover, the '085 patent fails to teach that ignition enhancing ability of an additive containing nitro (R—$CH_2$—$NO_2$, R being an alkyl group of tertiary substitution of 2 to 20 carbons) or ketone functionality for lower alcohols. Finally, the '085 patent does not teach an efficient synthesis of oxygenates or the additive synthesized from the materials inherent with direct partial oxidation.

Lower alcohols have traditionally been rendered suitable for usage in compression ignition engines when supplemented with ignition enhancers that raise the cetane number of such mixtures. Prior art ignition enhancers for methanol include triethyleneglycol dinitrate, octyl nitrate, cyclohexyl nitrate, 2-n-butyoxyethyl nitrate, 2-methoxyethyl nitrate, and tetrahydrofuryl nitrate. The synthesis of such compounds does not involve materials readily obtained through direct partial oxidation. Some prior art ignition enhancers for specifically improving ethanol blends include long chain polyethylene glycols. These compounds are also not readily synthesized from direct partial oxidation products. Moreover, the cost of these specialized compounds has been prohibitive for wide scale adoption of methanol as a diesel fuel in compression ignition engines. Finally, experience has shown that nitrogen emissions are not substantially increased by the usage of such nitrated compounds.

Accordingly, there is a need for improved diesel fuels that can be economically synthesized and which lack the said drawbacks.

SUMMARY

The present invention solves one or more problems of the prior art by providing in at least on embodiment a diesel fuel substitute composition. The composition includes an alcohol having formula (1), an acetal having formula (2) or formula (3), and an additive comprising a component selected from the group consisting of $C_{3-8}$ dialkyl ethers, alkylated phenols, $R-NO_2$, and combinations thereof where R is a aliphatic hydrocarbon with oxygenate functionality in an alpha or beta position to $NO_2$:

$$HOCR_1R_2R_3 \quad (1)$$

where:

$R_1R_2R_3$ are each independently H or a $C_{1-4}$ alkyl;

wherein:

$R_4$, $R_5$ are each independently hydrogen or $C_{1-3}$ alkyl;
$R_6$, $R_7$ are each independently hydrogen, methyl, or ethyl;
$R_8$ is a $C_{1-4}$ alkyl or another acetal linkage formed from a $C_{2-5}$ polyol;
$R_9$, $R_{10}$, $R_{11}$ are each independently $C_{1-4}$ alkyl; and
n is 0, 1 or 2;
with the proviso that the total number of carbon atoms in $R_4$ plus $R_5$ is from 1 to 3 and that the total of n plus the number of carbon atom in $R_6$ plus $R_7$ is from 0 to 2. Advantageously, the diesel fuel substitute composition is a liquid at standard temperature and pressure and has a Cetane number similar to conventional diesel, an intermediate lower heating value (70,000-80,000 Btu/gal), and better lubricity than dimethyl ether due to higher acetals.

In another embodiment, a method of making a diesel fuel substituent composition is provided. The method includes a step of providing a first mixture of $C_{1-5}$ alcohols, $C_{1-5}$ aldehydes, $C_{1-5}$ ketones, and $C_{1-5}$ organic acids. Oxygenated compounds are separated and/or dehydrated from the first mixture to form a second mixture. $C_{1-5}$ alcohols are at least partially separated from the second mixture to form a third mixture. The third mixture includes the $C_{1-5}$ alcohols. $C_{1-5}$ aldehydes and/or $C_{3-5}$ ketones and/or $C_{2-5}$ alcohols and/or $C_{2-5}$ polyols are synthesized from a portion of the third mixture. A fourth mixture including acetals (e.g., having formula 2 and 3) is formed from the third mixture and the $C_{1-5}$ aldehydes and/or $C_{3-5}$ ketones. In a variation, olefins can be synthesized via OTO or MTO and directly hydrated to form higher alcohols, which are then react with aldehydes and/or ketones to form acetals having formula 2 or 3. Acetals are separated from the fourth mixture. An additive is blended with the acetals. The additive includes a component selected from the group consisting of $C_{3-8}$ dialkyl ethers, alkylated phenols, $R-NO_2$, and combinations thereof where R is an aliphatic hydrocarbon (e.g., $C_{2-10}$ alkyl) with oxygenate functionality in an alpha or beta position to $NO_2$.

In the embodiments set forth above, alcohols are blended with alkyl acetals, and in particular, acetals having formula 2 and 3. The products of direct partial oxidation of alkanes are advantageously utilized with minimal processing in an unmodified compression ignition engine. Several safeguards are used to inhibit peroxide formation in ether contained therein. The first of which is the use of an inert atmosphere which prevents lower alcohol vapors from forming a flammable mixture due to their characteristically low flashpoint. Peroxides form in the presence of molecular oxygen and the substantial absence thereof is an added benefit. The second is the use of bases to suppress the formation of peroxides. Although the present mixture is preferably anhydrous, lower alcohols, being protic solvents, will disassociate in solution much to the same extent as water. In this capacity, water is known to inhibit peroxides. (Murphy, M., Safety and Industrial Issues Related to the Use of Oxygenates in Diesel Fuel. SAE technical paper 1999-01-1473, 1999). Finally, the problems of both characteristically poor ignition characteristics of lower alcohols in compression ignition engines and peroxide formation are solved by a single compound with dual functionality or multiple compounds of singular functionality. Furthermore, these compounds are also conveniently synthesized from the oxygenated blend obtained through direct partial oxidation of light alkanes in an innovative process that minimizes costly separations of the individual components. Advantageously, the substitute diesel fuel of the present invention is stable while possessing superior volatility, ignition characteristic, cold start properties, and energy density making it an excellent choice in a compression ignition engine.

In another embodiment, a system for producing a substitute diesel blend is provided. The system includes a separator for removing the $C_1-C_2$ alcohols along with higher volatility components such as acetone and methyl esters of acetic and formic acids as well as water and acids from a raw blend to form a concentrated blend, the raw blend including oxygenates from partial oxidation of hydrocarbon-containing gases. The concentrated blend includes alcohols, ketones and/or aldehydes. The system also includes a station for catalyzing the formation of acetal-containing blends from the concentrated blend, a station for removing water from the acetal-containing blend, a station for adding additional alcohols to the acetal-containing blend, and a station blending adding the ignition enhancer and peroxide inhibitor.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "alcohol" as used herein refers to C1-5 alcohols unless otherwise specifically indicated.

The term "aldehyde" as used herein refers to C1-5 aldehydes unless otherwise specifically indicated.

The term "ketone" as used herein refers to C1-5 ketones unless otherwise specifically indicated.

The term "organic acid" as used herein refers to C1-5 organic acids unless otherwise specifically indicated.

The term "carboxylic acid" as used herein refers to C1-5 carboxylic acids unless otherwise specifically indicated.

Throughout this application where publications are referenced, the disclosures of these publications in their entireties are hereby incorporated by reference into this application to more fully describe the state of the art to which this invention pertains.

The present invention provides an oxygenated substitute diesel blend, with enhanced safety and performance, and method for its synthesis. This synthesis can more efficiently be performed at smaller scales than oxygenates to diesel such that production can occur at the same point as demand. Direct partial oxidation of alkanes produces a raw blend of oxygenates including alcohols, aldehydes, ketones, and acids, as well as water. The blended mixture is subjected to separations in order to obtain a product rich in aldehydes and alcohols after which it is reacted in an acid catalyzed process to produce a blended acetal mixture. This blend is further refined or blended to a large extent and blended with lighter alcohols, ethers, and compounds possessing functionality for ignition enhancement and peroxide inhibition. Optionally, certain aldehydes can be reduced to diols. These products are easily derived from reactions of said oxygenates. The obtained product is inexpensively produced and can be utilized as a diesel substitute in a compression ignition engine.

In one embodiment, a diesel fuel substitute composition is provided. The composition includes an alcohol having formula (1), an acetal having formula (2) or formula (3), and an additive comprising a component selected from the group consisting of $C_{3-8}$ dialkyl ethers, alkylated phenols (e.g., substituted or unsubstituted $C_6$ phenols), R—$NO_2$, and combinations thereof where R is a aliphatic hydrocarbon (e.g., $C_{3-12}$ aliphatic hydrocarbon or $C_{4-10}$ aliphatic hydrocarbon) with oxygenate functionality (e.g., OH, ether (OR), O=, and the like) in an alpha or beta position to $NO_2$:

where:

$R_1R_2R_3$ are each independently H or a $C_{1-4}$ alkyl;

where:

$R_4$, $R_5$ are each independently hydrogen or $C_{1-3}$ alkyl;

$R_6$, $R_7$ are each independently hydrogen, methyl, or ethyl;

$R_8$ is a $C_{1-4}$ alkyl or another acetal linkage formed from a $C_{2-5}$ polyol;

$R_9$, $R_{10}$, $R_{11}$ are each independently $C_{1-4}$ alkyl;

n is 0, 1 or 2;

with the proviso that the total number of carbon atoms in $R_4$ plus $R_5$ is from 0 to 3 and that the total of n plus the number of carbon atom in $R_6$ plus $R_7$ is from 0 to 2. An example of an acetal linkage for $R_8$ is:

where n' is 2 to 5 and $R_6$, $R_7$, $R_9$, $R_{10}$, $R_{11}$ are as set forth above.

In a refinement, R—$NO_2$ is described by the following formulae:

wherein $X_1$ is an oxygenate functionality; and
R' is a $C_{1-12}$ alkyl group.

In a refinement, the $X_1$ is a doubly bonded oxygen atom (O=), OH, or OR" where R" is a $C_{1-6}$ alkyl group. It should be understood that the carbon to which $X_1$ is bonded can include a hydrogen atom if $X_1$ is singly bonded or no hydrogen atom if $X_1$ is doubly bonded.

In a further refinement a carbon in R" as described above can be bonded with a nitrate ester $ONO_2$ functionality or another ether functionality with the proviso that at least one nitrate ester group $ONO_2$ is bonded to a carbon in the polyether. In a further refinement, this further ether functionality includes a $C_2$ to $C_6$ alkyl group In a refinement, the alcohol having formula (1) is present in an amount from 0.01 to 90 mole percent, the acetal (e.g., formula 2 and 3) is present in an amount from 10 to 90 mole percent, and the additive is present in an amount 0.01 to 10 mole percent. In another refinement, the alcohol having formula (1) is present in an amount of at least in order of increasing preference, 0.01, 1, 2, 5, 10, 20, 25, 30, 40, 50, 60, and 70 mole percent. In another refinement, the alcohol having formula (1) is present in an amount of at most in order of increasing preference, 10, 20, 30, 40, 50, 60, 70, 80, and 90 mole percent. In another refinement, the acetal (e.g., having formula 2 and 3) is present in an amount of at least in order of increasing preference, 25, 30, 40, 50, 60, 70, and 80 mole percent. In another refinement, the acetal (e.g., having formula 2 and 3) is present in an amount of at most in order of increasing preference, 10, 20, 30, 40, 50, 60, 70, 80, and 90 mole percent. In another refinement, the additive is present in an amount of at least in order of increasing preference, 0.01, 1, 2, 3, 4, 5, 6, 7 and 8 mole percent. In another refinement, the additive is present in an amount of at most in order of increasing preference, 1, 2, 3, 4, 5, 6, 7, 8, 9, and 10 mole percent.

In another embodiment, a method of making a diesel fuel substituent composition is provided. The method includes a step of providing a first mixture of $C_{1-5}$ alcohols (or $C_{1-4}$ alcohols), $C_{1-5}$ aldehydes, $C_{1-5}$ ketones, and $C_{1-5}$ organic acids. Oxygenated compounds are separated and/or dehydrated from the first mixture to form a second mixture. $C_{1-5}$ alcohols or $C_{1-4}$ alcohols are at least partially separated from the second mixture to form a third mixture. In a refinement, the $C_{1-5}$ aldehydes and/or $C_{3-5}$ ketones are synthesized by oxidation or oxidative dehydrogenation of the $C_{1-5}$ alcohols in the third mixture. The third mixture includes the $C_{1-5}$ alcohols. $C_{1-5}$ aldehydes and/or $C_{3-5}$ ketones and/or $C_{2-5}$ alcohols and/or $C_{2-5}$ polyols are synthesized from a portion of the third mixture. In another refinement, a portion of alcohols and polyols for acetal formation are synthesized from olefins derived from oxygenate to olefin technology using oxygentates in the second and third mixture. In another refinement, $C_{2-5}$ aldehydes are synthesized from a hydroformylation reaction from the third mixture.

A fourth mixture including acetals (e.g., having formula 2 and 3) is formed from the third mixture and the $C_{1-5}$ aldehydes and/or $C_{3-5}$ ketones. In a refinement, the $C_{1-5}$ aldehydes and/or $C_{3-5}$ ketones used to form the acetals are synthesized by oxidation or oxidative dehydrogenation of the $C_{1-5}$ alcohols in the third mixture. In a variation, the acetals are formed from a reaction of $C_{1-5}$ or $C_{1-4}$ alcohols and glyoxal. In a refinement, the acetal has at least one nitrate functionality. Acetals (e.g., having formula 2 and 3) are separated from the fourth mixture. An additive is blended with the acetals. The additive includes a component selected from the group consisting of $C_{3-8}$ dialkyl ethers, alkylated phenols (e.g., $C_{6-12}$ phenols), R—$NO_2$, and combinations thereof where R is a aliphatic hydrocarbon with oxygenate functionality in an alpha or beta position to $NO_2$ as set forth above. In a refinement, the additive is a compound such that peroxide inhibition and ignition enhancement occur on a same molecule via an Aldol reaction of a nitro-alkane on an aldehyde. This nitrogenated compound can be prepared from reactions involving the third mixture. In some refinements, a secondary alcohol is formed by full hydrogenation of an unsaturated ketone or aldehyde produced by an Aldol condensation of an aldehyde and a ketone or a ketone and a ketone from the first mixture or the second mixture or the third mixture or fourth. In other refinement, a $C_{2-5}$ aldehyde is derived from an Aldol condensation of two lower aldehydes (e.g., $C_{1-3}$ aldehydes from first mixture or the second mixture or the third mixture or fourth mixture) followed by a dehydration of an Aldol product to an unsaturated aldehyde, followed by a selective hydrogenation of a carbon-carbon double bond. In a refinement, an acetal blend includes processed $C_{1-2}$ alcohols and the acetals preferably having formula 2 and 3.

As set forth above, acetals having formula 2 and 3 are formed from a reaction of glyoxal and $C_{1-5}$ or $C_{1-4}$ alcohols from the first or second or third or fourth mixtures. The glyoxal can be produced from glycol aldehyde. The glycol aldehyde can be produced according via condensation of formaldehyde or through hydroformylation of formaldehyde with synthesis gas. In a refinement, glycol aldehyde is hydrogenated to form ethylene glycol and reacted with $C_1$-$C_5$ aldehydes and ketones to produce dioxolane, dioxolane analogs formed by higher aldehydes and ketones, and acetals with at least 1 common $C_2$ linkage Direct partial oxidation of natural gas generates a liquid oxygenate blend consisting predominately of alcohols, aldehydes and water, where methanol and formaldehyde are found in the greatest concentrations. In the same process higher alcohols and aldehydes, such as those consisting of more than 2 carbon atoms ($C_2$+), are also produced. Examples of these oxygenates include but are not limited to ethanol, propanol, acetaldehyde, propionaldehyde, and acetone. Smaller concentrations of organic acids are also produced in the direct partial oxidation process.

U.S. Pat. Nos. 7,456,327; 7,578,981; 7,642,293; 7,687,669; 7,879,296; 7,910,787; 8,193,254; 8,202,916; and 8,293,186 provide systems and methods for making the first mixture. The entire disclosures of these patents are hereby incorporated by reference. In a variation, the first mixture (i.e., a blend of partially oxygenated compounds) is formed by reacting a hydrocarbon-containing gas with an oxygen-containing gas to form the second mixture. The hydrocarbon-containing gas includes one or more components selected from the group consisting of methane, ethane, propane, butane, and pentane. In a refinement, the hydrocarbon-containing gas includes methane and ethane. In a refinement, the hydrocarbon-containing gas includes two or more components selected from the group consisting of methane, ethane, propane, butane, and pentane. In a refinement, the hydrocarbon-containing gas includes three components selected from the group consisting of methane, ethane, propane, butanes, and pentanes. In a refinement, the hydrocarbon-containing gas includes methane, ethane and propane, butane. In another refinement, the hydrocarbon-containing gas includes at least four components selected from the group consisting of methane, ethane, propane, butane, and pentane. In another refinement, the hydrocarbon-containing gas includes methane, ethane, propane, and butane. In still another refinement, the hydrocarbon-containing gas includes methane, ethane, propane, butane, and pentane. In a refinement, the hydrocarbon gas includes 10 to 100 mole percent methane, 0 to 30 mole percent ethane, 0 to 10 mole percent propane, 0 to 5 percent butanes (n-butane, isobutane), 0 to 2 percent pentanes (n-pentane, neopentane, isopentane). In a still another refinement, the hydrocarbon gas includes 30 to 80 mole percent methane, 2 to 10 mole percent ethane, 0.5 to 5 mole percent propane, 0.1 to 2 percent butanes (n-butane, isobutane), 0.02 to 1 percent pentanes (n-pentane, neopentane, isopentane). In a yet another refinement, the hydrocarbon gas includes 50 to 65 mole percent methane, 3 to 6 mole percent ethane, 0.5 to 2 mole percent propane, 0.1 to 1 percent butanes (n-butane, isobutane), 0.05 to 1 percent pentanes (n-pentane, neopentane, isopentane). In a variation, the blend of partially oxygenated compounds (i.e., the first mixture) formed by these methods includes acetone, methanol, ethanol, isopropanol, formic acid, formaldehyde, and water. In a refinement, the blend of partially oxygenated compounds further includes dimethoxymethane, 1,1 dimethoxyethane, methyl formate, methyl acetate. In another refinement, the blend of partially oxygenated compounds also includes acetic acid or esters thereof. Typically, blend of partially oxygenated compounds includes 0 to 10 mole percent acetone, 10 to 60 mole percent methanol, 0.5 to 20 mole percent ethanol, 0.0 to 10 mole percent isopropanol, 1 to 10 mole percent acetic acid, 0.5 to 5 mole percent formic acid, 1 to 20 mole percent formaldehyde, 0 to 3 mole percent dimethoxymethane, 0 to 3 mole percent 1,1 dimethoxyethane, 0 to 3 mole percent methyl formate, 0 to 3 mole percent methyl acetate, and 20 to 60 mole percent water. In a refinement, the blend of partially oxygenated compounds includes 1 to 10 mole percent acetone, 10 to 60 mole percent methanol, 1 to 20 mole percent ethanol, 0.1 to 10 mole percent isopropanol, 1 to 10 mole percent acetic acid, 0.5 to 5 mole percent formic acid, 1 to 20 mole percent formaldehyde, 0 to 3 mole percent dimethoxymethane, 0 to 3 mole percent 1,1 dimethoxyethane, 0 to 3 mole percent methyl formate, 0 to 3 mole percent methyl acetate, and 20 to 60 mole percent water. In another refinement, the blend of partially oxygenated compounds includes 2 to 10 mole percent acetone, 25 to 60 mole percent methanol, 1 to 20 mole percent ethanol, 0.1 to 10 mole percent isopropanol, 1 to 10 mole percent acetic acid, 0.5 to 5 mole percent formic acid, 1 to 20 mole percent formaldehyde, 0 to 3 mole percent dimethoxymethane, 0.02 to 2 mole percent 1,1 dimethoxyethane, 0.02 to 2 mole percent methyl formate, 0.02 to 2 mole percent methyl acetate, and 20 to 60 mole percent water. In still another refinement, the blend of partially oxygenated compounds includes 3 to 10 mole percent acetone and/or 25 to 60 mole percent methanol and/or 1 to 20 mole percent ethanol and/or 0.1 to 10 mole percent isopropanol and/or 1 to 10 mole percent acetic acid and/or 0.5 to 5 mole percent formic acid and/or 1 to 20 mole percent formaldehyde and/or 0.02 to 1 mole percent dimethoxymethane and/or 0.02 to 1 mole percent 1,1 dimethoxyethane and/or 0.02 to 1 mole percent methyl formate and/or 0.02 to 1 mole percent methyl acetate and/or 20 to 60 mole percent water.

Figure 1:
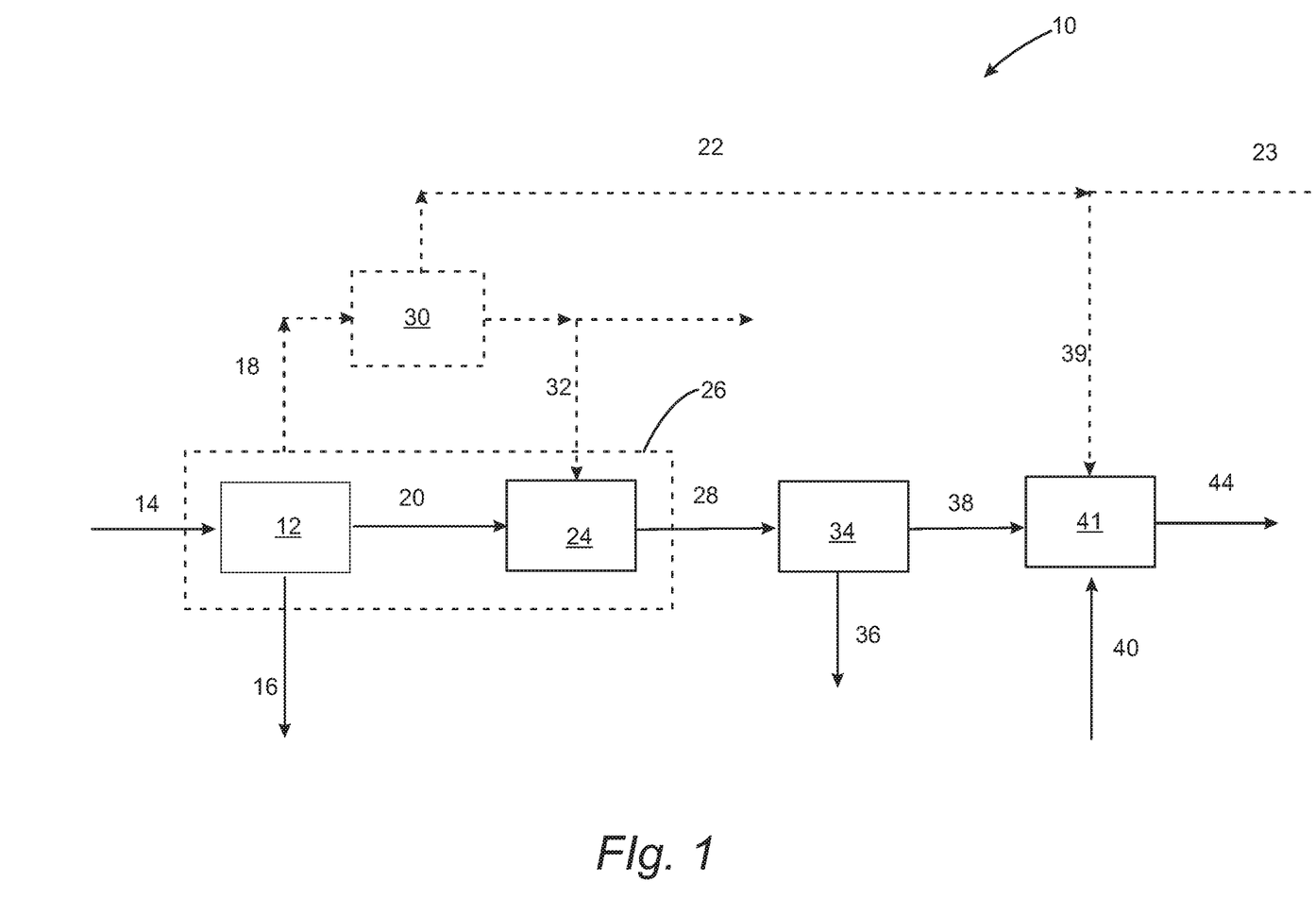
FIG. 1 provides a schematic depicting a system for making a substitute diesel fuel composition.

With reference to FIG. 1, a schematic of a system for producing a fuel is provided. In a variation, this system is used to produce the diesel blend set forth above. In general, the system of this embodiment takes a raw liquid blend of alcohols, aldehydes, esters, and ketones and separates out lower alcohols ($C_1$ and $C_2$), and in particular methanol. The remaining alcohols, aldehydes, and ketones are subjected to acetalization with water being removed. A substitute diesel fuel is formed from the resulting products as set forth below. System 10 includes separator 12 into which raw liquid blend 14 is introduced. In a refinement, the raw blend is obtained from a partial oxidation process of hydrocarbon-containing gases (e.g., methane, propane, n-butane, isobutane, etc.) as set forth in U.S. Pat. Nos. 7,456,327; 7,578,981; 7,642,293; 7,687,669; 7,879,296; 7,910,787; 8,193,254; 8,202,916; and 8,293,186 the entire disclosures of which are hereby incorporated by reference. Typically, liquid blend 14 is obtained by partial oxidation of a hydrocarbon-containing gas with molecular oxygen (e.g. for air), with or without a catalyst. In a particularly useful process a catalyst is not used as set forth in U.S. Pat. Nos. 7,456,327; 7,578,981; 7,642,293; 7,687,669; 7,879,296; 7,910,787; 8,193,254; 8,202,916; and 8,293,186. In one example, a hydrocarbon-containing gas including $C_{1-5}$ hydrocarbons is reacted with an oxygen-containing gas (e.g., air, oxygen, etc.)

In separator 12, water and acids 16 are preferentially separated from alcohols, aldehydes, and ketones, leaving an alcohol and aldehyde enriched blend. Typically, this enriched blend includes $C_{1-5}$ alcohols and $C_{1-5}$ aldehydes. In a refinement, the enriched blend includes $C_{1-4}$ alcohols and $C_{1-4}$ aldehydes. It is readily recognized that any number of separation techniques are useful for obtaining a concentrated alcohol and aldehyde blend. Examples of such techniques include, but are not limited to, fractional condensation; distillation; azeotropic distillation; extractive distillation; vacuum distillation; fractional distillation; membrane, liquid-liquid extraction; dehydration over zeolites, hydroscopic polymers, and the like; and combinations thereof. In the same or subsequent step, higher volatility alcohols in the $C_1$-$C_2$ range depicted by item number 18 are separated from the blend to leave behind concentrated mixture 20 so as to reduce the formation of dimethoxy methane (DMM) in subsequent steps. Methanol is preferentially substantially removed in this step. Typically, concentrated mixture 20 includes $C_{2-5}$ alcohols and $C_{1-5}$ aldehydes. In a refinement, concentrated mixture 20 includes $C_{2-4}$ alcohols and $C_{1-4}$ aldehydes. This separation is performed by similar methods as set forth above with the specific examples of useful separation techniques being the same. Advantageously, the methanol is recovered for subsequent processing indicated by item numbers 22, 23. DMM is typically not desirable for use as a fuel when present in high concentrations due to its high vapor pressure and lower energy density. Stream 23 may contain volatile components in addition to methanol such as light ketones (acetone), methyl acetate, and methyl formate. These components are well known to be of high octane, and may be sold as a synthetic fuel (i.e., a high octane mixture) for spark ignition engines in addition to the diesel like stream 44.

The acids recovered in stream 16 may be transformed into ketones. $C_1$ to $C_5$ acids are known to form ketones with inorganic oxide catalysts at 300 to 400° C. These ketones would have a carbon number one less than the sum of the two reacting $C_1$-$C_5$ carboxylic acids with the balance carbon going to $CO_2$. In the case of formic acid reacting with formic acid, formaldehyde would result. These compounds would further react to form acetals later in the process. (Carlos, J et. al., Catalytic Production of Liquid Transportation Fuels 2.2.2.3)

Concentrated mixture 20 desirably contains less than 1 mole percent organic acids and less than 5 mole percent water, but is rich in higher (i.e., $C_{2-4}$) alcohols, aldehydes, and ketones. In a refinement, concentrated mixture 20 includes less than about 1 mole percent water and less than 0.1 mole percent organic acids and greater than 50 mole percent of a mixture of the following: $C_2$-$C_4$ alcohols, $C_1$-$C_4$ aldehydes, and $C_3$-$C_4$ ketones. Concentrated mixture 20 is then reacted over an acid catalyst 24. Examples of suitable acid catalysts include, but not limited to, sulfuric acid, hydrochloric acid, sulfonic acid polymer, zirconium sulphate, and combinations thereof. In a refinement, the reaction with acid catalyst 24 is performed at a temperature from about 0 to 300° C. and at pressures from 0 to 100 bar gauge such that the alcohols and polyols contained in concentrated mixtures 20 and 32 in the presence of aldehydes therein form dialkyl acetals (e.g., having formula 2 and 3). In another refinement, acetals such as methyl ethyl acetal that have a volatility substantially greater than that of water can be synthesized and separated from water by means of reactive distillation a depicted by item number 26.

In a variation of the dialkyl acetal synthesis process set forth, it is advantageous to increase the aldehyde fraction so as to ensure the conversion of $C_{2-5}$ alcohols or $C_{2-4}$ alcohols to acetals (e.g., formula 2 and 3) and to maximize the molar acetal fraction of the mixture 20. In this process it is desirable to produce a sufficient quantity of $C_{1-5}$ aldehydes or $C_{1-4}$ aldehydes to ensure conversion of all higher (i.e., $C_{2-4}$) alcohols to acetals. Dialkoxy acetals of aldehydes with increasing carbon number are more diesel like, having higher cetane number, lubricity and energy density. There are several methods capable of synthesizing these aldehydes. In one refinement, formaldehyde is produced by an oxidation reaction or a dehydrogenation/oxydehydrogenation reaction. In one variation of the oxidation process, methanol, and in particular the methanol previously recovered from stream 18, is reacted with an excess of air at a temperature from about 300 to 500° C. over mixed iron/molybdenum oxide catalyst in reactor 30. Item number 32 depicts the combining of formaldehyde produced in this manner with mixture 20 for acetal formation. In a further refinement methanol is preferably obtained from a partial oxidation process of a hydrocarbon-containing gases (e.g., methane, propane, n-butane, isobutane, etc.) as set forth in U.S. Pat. Nos. 7,456,327; 7,578,981; 7,642,293; 7,687,669; 7,879,296; 7,910,787; 8,193,254; 8,202,916; and 8,293,186 the entire disclosures of which are hereby incorporated by reference. In the dehydrogenation type processes, a molar excess of methanol is typically reacted with air at 600-650° C. over a silver catalyst. $C_2$-$C_5$ aldehydes or $C_2$-$C_4$ aldehydes may optionally be formed by similar reactions of the corresponding higher alcohol. For example, acetaldehyde can be formed from air and ethanol with modified copper catalysts at 250-300° C. or from air and ethanol with silver catalysts at 0-5 bars or pressure and at 400-600° C.

In another variation the aldehyde and ketone content of mixture 20 is increased as follows. Aldehydes are synthesized by the hydroformylation of olefins with synthesis gas. In a refinement, olefins are created by methanol-to-olefins (MTO) methods or oxygenates-to-olefins (OTO) methods. Traditional MTO processes typically involve an equilibrium conversion of methanol to dimethyl ether (DME) followed by a reaction over a small pore zeolite at 1-10 bar. Pure DME can also be reacted over zeolites directly to create olefins. In another variation, dehydration of the $C_2$-$C_4$ alcohols forms olefins to be used for hydroformylation. In particular, an alcohol is synthesized by a hydroformylation reaction of an olefin to an aldehyde followed by a hydrogenation of the aldehyde to a primary alcohol. This can also occur in the so called oxygenates-to-olefins (OTO) process where oxygenates such as aldehydes, ketones, and alcohols are reacted over similar small pore zeolites at similar temperatures and pressures to from olefins. Hydroformylation is a reaction of synthesis gas comprising $H_2$ and CO with an unsaturated hydrocarbon to create an aldehyde, usually a normal aldehyde, of an increased carbon length of +1 as compared to the unsaturated hydrocarbon. This homogenous reaction is typically carried out in the liquid phase with rhodium or cobalt catalysts, often with phosphine ligands. (Arpe, Industrial Organic Chemistry, 5ed) The synthesis gas is preferably obtained through reforming the reject gas of the direct partial oxidation process.

Glycol aldehyde is another aldehyde that can be added to mixture 20 to lower the volatility of the corresponding acetal. When forming acetals with alcohols, the alcohol functionality will contribute to hydrogen bonding and thus lower the volatility. Strong base catalyzed self-condensation of formaldehyde produces glycol aldehyde. Aldol condensations also produce aldehydes with alcohol functionality.

The homogenous liquid phase reaction of formaldehyde and CO/$H_2$ at 50-350 bar with cobalt, rhodium, or ruthenium with phosphine ligands is known to produce glycol aldehyde as well. In a refinement, formaldehyde hydroformylation and olefin hydroformylation are carried out in the same reactor.

If aldehydes are in excess in mixture 20, these previously mentioned aldehydes with alcohol functionality produced in reactor 30 may be further hydrogenated into polyols such as diols. These diols can then be reacted with the aldehydes and alcohols present in stream 20 to produce linked acetals. In particular, the polyols can be reacted with $C_{1-4}$ aldehydes, $C_{3-4}$ ketones, and $C_{2-5}$ dialdehydes.

As a further processing step, glycol aldehyde may be optionally oxidized to glyoxal. This is carried out in reaction conditions similar to those which form $C_{1-5}$ aldehydes from alcohols. Dimethyl acetals of glyoxal are similar to methylal in ignition performance and resistance to peroxide formation yet have a higher vapor pressure. Furthermore, one mole of glyoxal will react with four moles of alcohols such that less aldehyde is required in stream 32 for the same effect. Similarly, glyoxal can consume excess volatile alcohols such as methanol present in stream 20.

If aldehydes, especially formaldehyde, are present in excess of $C_2$-$C_5$ alcohols or $C_2$-$C_4$ alcohols, it may be necessary to increase said alcohol fraction. This is conveniently performed by hydrogenation of the $C_2$-$C_5$ aldehydes or $C_2$-$C_4$ aldehydes such as those formed via condensation or with synthesis gas by the methods set forth above. Specifically, the $C_{2-5}$ aldehydes and/or $C_{3-5}$ ketones for acetal production can be synthesized from alcohols and synthesis gas in a homologation reaction which creates aldehydes and/or alcohols. The hydrogenation may be performed with standard hydrogenation catalysts in the liquid phase or heterogeneously at 0-200 bars. Synthesis gas may optionally be a source of hydrogen. As previously stated, if the aldehyde contains at least one other aldehyde, ketone, or alcohol functionality, the derivative will be a polyol. For example, glycol aldehyde will form ethylene glycol following hydrogenation. Unsaturated carbon bonds may also be optionally hydrogenated in the same reactor.

After the majority of $C_{2-4}$ alcohols have been converted to dialkyl acetals, the acetal-containing blend 28 is separated at separator 34 from the water generated in the dialkyl acetal synthesis process and disposed of as indicated by item number 36. The acetal rich stream 38 is then mixed with additional alcohols 39 (preferentially methanol) not submitted to the acetal synthesis process via stream 32 as well as additive compounds 40 derived from the oxygenated mixture at mixing station 41, which increase both the ignition properties and inhibit peroxide formation. Acetals, especially those containing alkyl groups higher than that of dimethoxymethane, and ethers containing alkyl groups higher than that of dimethyl ether, are known to form dangerous peroxides with prolonged exposure to molecular $O_2$. These peroxides can concentrate and detonate. The synthesis of such additive compounds is as follows.

A $C_2$-$C_5$ aldehyde or a $C_2$-$C_4$ aldehyde with a carbon number greater than or equal to that of acetaldehyde is obtained by the previously mentioned methods for obtaining an aldehyde directly or derived from the product blend. Nitromethane can be synthesized by a reaction of nitric acid and $C_3$-$C_4$ alkanes. As these alkanes are the feed to direct partial oxidation, nitro alkanes would easily be synthesized by materials on hand. A base catalyzed addition similar to an Aldol reaction of nitromethane and carbonyl compounds produces a nitro alcohol, with the alcohol in the beta position to the nitrate group. Being polar and protic, this compound can act as an antioxidant for peroxides.

In a refinement, the alpha or beta hydroxy group on the nitro alkanol can undergo an etherification or a transetherification with $C_2$ to $C_6$ diols and/or $C_2$ to $C_4$ dialkyl ethers and/or $C_1$ to $C_3$ alkanols to produce the corresponding ether or poly ether substituent. The reactivity of the molecule can be increased by further esterifying remaining OH groups on said ether or poly ether substituent with nitric acid. The nitric acid ester is well known in industry as a potent ignition enhancer. Ether and transetherification reactions can proceed as follows. Solid acid and strong acid catalysts such as those mentioned for acetalization reactions are capable of forming ethers at temperatures from 100 to 250 C and pressures from 50 to 500 psig. Transetherification reactions, such as those which exchange alkoxy groups with an alcohol can be performed via polymers with acid functionality or heteropoly acid catalysts according to U.S. Pat. Nos. 4,321,413, 4,579,980 and 6,730, 815. None of these patents disclose reacting an organic nitro compound with alpha or beta OH functionality. The diol can be obtained from afore mentioned synthesis of diols from aldehydes, or from bio-derived sources. "Novel Catalysts for Glycol Manufacture" by Crabtree et. Al. details typical synthesis of diols from such sources.

If this compound is further oxidized to the ketone, this compound will inhibit peroxides as well. The nitrate group is well known to act as an ignition enhancer. Therefore, the addition of this compound will provide dual functionality for both peroxide inhibition and ignition enhancement. Alternatively, the said nitro alcohol compound can be reacted with an alcohol and an aldehyde to form the acetal with nitrate functionality. Alternatively, the nitro alcohol can be dehydrated to a nitro-alkene. Addition of an alcohol over this unsaturated bond will form the corresponding nitro-ether with excellent ignition enhancing properties.

Industrially, there are several methods used to oxidize secondary alcohols into ketones which could be employed to oxidize the secondary alcohol in the beta position to the $NO_2$ group. Dehydrogenation of 2-butanol is known to occur in the liquid phase with Raney nickel or copper chromite and in the gas phase at 400-500° C. over a zinc oxide or copper-zinc catalyst. (Arpe, Industrial Organic Chemistry, 5ed)

In another refinement, acetone is formed by oxidative dehydrogenation of 2-propanol to acetone over silver or copper catalysts at 400-600° C. This reaction is analogous to the oxy-dehydrogenation of methanol or ethanol to aldehydes described above. (Arpe, Industrial Organic Chemistry, 5ed)

Another possibility is transferring the hydrogen in the nitro alcohol to an aldehyde akin to the production of allyl alcohol from acrolein by transferring hydrogen from 2-propanol or 2-butanol to the acrolein forming acetone or methyl ethyl ketone. This reaction is carried out over magnesium/zinc oxide catalysts at 400° C. Finally, the OH group on the nitro alcohol might be dehydrated to form an unsaturated nitro compound. In a reaction akin to the conversion of ethylene to acetaldehyde, an unsaturated carbon-carbon bond is oxidized to a from a carboxyl (CO) group over one of the carbons. With ethylene to acetaldehyde, this reaction is carried out in air at 110-120° C. and 10-20 bar pressure. This occurs in the liquid phase of a $Cu/PdCl_2$ system similar to the Wacker-Hoechst oxidation of ethylene to acetaldehyde. Again, it is feasible to oxidize both ethylene to acetaldehyde for higher acetal production and the nitroalkene to the nitroketone in the same reactor. (Arpe, Industrial Organic Chemistry, 5ed) The ketone in the alpha position is a byproduct of this reaction. Alternatively, electrochemical methods are known to oxidize secondary alcohols to ketones. Finally, traditional reagents such as hexavalent chromium oxides may also be employed for this purpose.

Higher dialkyl ethers such as methyl ethyl ether and diethyl ether may optionally be added to this blend as ignition enhancers and cold start improvers. In a refinement, these dialkyl ethers are formed by reaction of the alcohols (e.g., methanol and ethanol) formed above. Alcohols do not have favorable cold start characteristics which may be overcome by the addition of these ethers. Cetane improvement would also result from the usage of dialkyl ethers. Convenient ether forming reactions include acid catalyzed ether synthesis from alcohols as well as methanol addition over an unsaturated carbon-carbon bond. The alcohols would be produced in the afore mentioned methods.

The final product blend 44 therefore presents a higher cetane number and lubricity than $C_1$ alcohols and acetals, and is not hampered by the poor ignition characteristics of lower alcohols alone ($C_1$ and $C_2$) or the high volatility of dimethoxymethane. In a refinement, formation of peroxides is limited by the addition of an inhibitor compound which also functions as an ignition enhancer. Moreover, the poor cold start characteristics of methanol are mitigated. Finally, chemicals produced in this manner such as polyols and aldehydes may be utilized for their value as chemicals aside from their energy value as a substitute diesel fuel.

Figure 2:
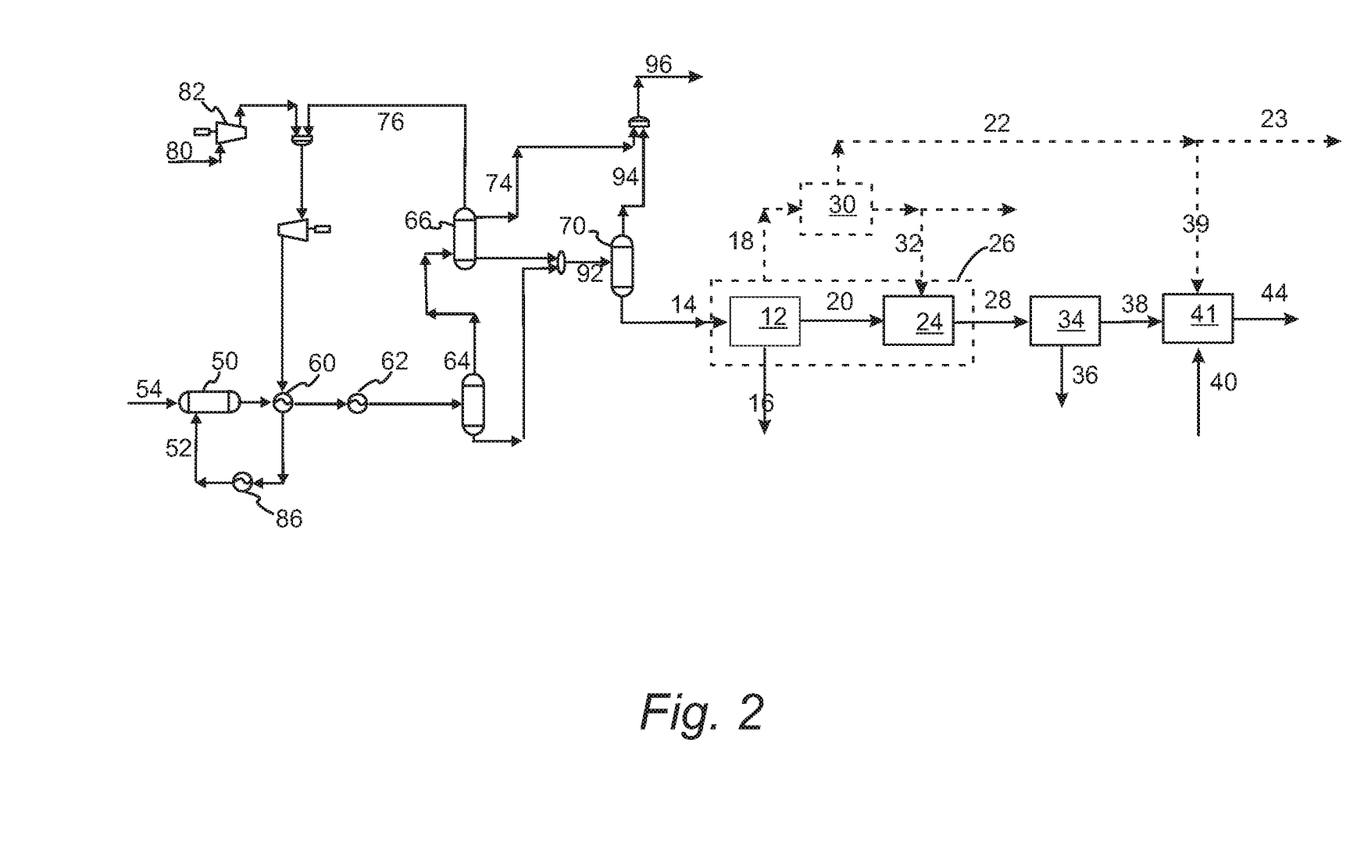
FIG. 2 provides a schematic of the system of FIG. 1 coupled to a system for producing and oxygenate blend.

With reference to FIG. 2, a schematic illustration depicting the coupling of the substitute diesel fuel system of FIG. 1 coupled carbonaceous gas to oxidized products in a gas-to-chemicals (GTL) process of U.S. Pat. No. 9,255,051 is provided. The entire disclosure of U.S. Pat. No. 9,255,051 is hereby incorporated by reference in its entirety. In a refinement, the system of FIG. 1 is coupled to the gas-to-chemicals system in a continuous fashion. Homogeneous direct partial oxidation is performed in a reactor 50 which is supplied with a hydrocarbon-containing gas 52 and an oxygen-containing gas 54. In a refinement, the reaction is operated at pressures from about 450 to 1250 psia and temperatures from about 350 to 450° C. In particular, hydrocarbon-containing gas 52 and an oxygen-containing gas 54 react in a vessel to form a first product blend which is a blend (i.e., mixture) of partially oxygenated compounds that include formaldehyde. In a refinement, the first product blend and/or output stream 14 include $C_{1-10}$ alcohols and/or $C_{1-5}$ aldehydes and/or $C_{3}$-$C_{5}$ ketones. In another refinement, the first product blend and/or output streams 31, 32 include an alcohol selected from the group consisting of methanol, ethanol, propanols, butanols, pentanols and combinations thereof, and/or aldehydes selected from the group consisting formaldehyde, acetaldehyde, propionaldehyde and/or ketones selected from the group consisting of acetone, methyl ethyl ketone, pentanones, and combinations thereof. In another refinement, the first product blend and/or output streams 31, 32 include an alcohol selected from the group consisting of methanol, ethanol, and combinations thereof, and aldehyde selected from the group consisting formaldehyde, acetaldehyde, and combinations thereof. Examples of systems and methods of performing the partial oxidation as set forth in U.S. Pat. Nos. 8,293,186; 8,202,916; 8,193,254; 7,910,787; 7,687,669; 7,642,293; 7,879,296; 7,456,327; and 7,578,981; the entire disclosures of which are hereby incorporated by reference. In a refinement, the hydrocarbon-containing gas includes $C_{1-10}$ alkanes or $C_{1-5}$ alkanes. In another refinement, the hydrocarbon-containing gas includes an alkane selected from the group consisting of methane, ethane, propanes, butanes, pentanes and combinations thereof. In another refinement, the hydrocarbon-containing gas includes an alkane selected from the group consisting of methane, ethane, and combinations thereof. In another refinement, the hydrocarbon-containing gas includes a component selected from the group consisting of $H_2$, $CO_2$, CO, $N_2$, $H_2S$, $H_2O$, oxygenates, and combinations thereof.

Examples of oxygen containing gas include molecular oxygen which may be in the form of concentrated oxygen or air. In a refinement, the oxygen-containing gas stream is made oxygen rich (e.g., by passing air through a membrane to increase oxygen content). The low conversion and selectivity of homogeneous direct partial oxidation requires that a recycle loop is utilized to increase the overall carbon efficiency.

Following partial oxidation reaction the reactant stream is rapidly cooled in a series of heat exchangers 60 and 62 to prevent decomposition of the produced oxygenates. The heat energy transferred by exchanger 62 might optionally be used to provide energy which may be used in the creation of synthesis gas. After cooling the liquids are separated from the gas stream as station 64. The gas stream is then submitted to a separation process for removal of non-hydrocarbon fractions at station 66 which may be performed via scrubbing, membrane separation, adsorption processes, cryogenic separations, or by purging a small gas fraction. If station 66 is a liquid scrubbing system, liquid products are sent to a flash drum 70 where dissolved gases are removed. Non-hydrocarbon gases 74 are removed from the recycle loop, and the hydrocarbon gases 76 are then recycled to combine with fresh methane gas 80 which has been pressurized to the pressure of the loop by compressor 82. The stream composed of recycled hydrocarbons plus fresh methane gas is pressurized to make up for pressure losses in the recycle loop, preheated via the cross exchanger 60 and further by the preheater 86, when necessary, to meet the desired reaction conditions.

Liquids generated by the gas-to-chemicals process are composed predominantly of alcohols and aldehydes (e.g., methanol, ethanol and formaldehyde) as set forth above. The raw liquid stream 92 generated by the GTL process is generally composed of 50-70% alcohols and 5-20% aldehydes 15-30% water. Downstream processing of these liquids may include a number of different synthesis routes to higher-value chemicals and fuels, but simple distillation of alcohols from aldehydes is performed in a simple fractional distillation column in which alcohols are recovered in the distillate and the aqueous aldehyde solution from the column bottoms The compositions of the gas streams obtained from separation of non-hydrocarbon gases 74 from the recycle loop and from degassing the liquid mixture 94 may vary significantly depending on the separation methods employed in station 66. Stream 94 would be typically be needed to regenerate a scrubbing fluid by liberating dissolved gasses such as carbon dioxide or carbon monoxide, which would be enriched in this stream. Stream 94 is composed predominantly of lighter hydrocarbons and carbon oxides (e.g., $CO_2$) which are soluble in the liquid solution, but are vaporized when decreasing the pressure. The stream of non-hydrocarbon gases 74 and stream 94 are blended to form stream 96, which is rich in synthesis gas.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
    a) providing a first mixture of oxygenates including $C_{1-5}$ alcohols and a component selected from the group consisting of including $C_{1-5}$ aldehydes, $C_{1-5}$ ketones, $C_{1-5}$ organic acids, and combinations thereof;
    b) separating and dehydrating oxygenated compounds from the first mixture to form a second mixture as separated and dehydrated oxygenated compounds, the second mixture comprising the separated and dehydrated oxygenated compounds which include the $C_{1-5}$ alcohols;
    c) partially separating $C_{1-5}$ alcohols from the second mixture to form a third mixture, the third mixture including the $C_{1-5}$ alcohols;
    d) synthesizing $C_{1-5}$ aldehydes and/or $C_{3-5}$ ketones from the $C_{1-5}$ alcohols in a portion of the third mixture;
    e) forming a fourth mixture including acetals formed from $C_{1-5}$ alcohols in the third mixture and the $C_{1-5}$ aldehydes and/or $C_{3-5}$ ketones synthesized in step d);
    f) separating acetals from the fourth mixture; and
    g) blending an additive with the acetals, the additive comprising a component selected from the group consisting of $C_{3-8}$ dialkyl ethers, alkylated phenols, R—$NO_2$, and combinations thereof, where R is an aliphatic hydrocarbon with oxygenate functionality in an alpha or beta position to $NO_2$.

2. The method of claim 1 wherein the first mixture includes acetone, methanol, ethanol, isopropanol, formic acid, formaldehyde, water.

3. The method of claim 2 wherein the first mixture includes further includes dimethoxymethane, 1,1 dimethoxyethane, methyl formate, methyl acetate.

4. The method of claim 1 wherein the first mixture comprises 0 to 10 mole percent acetone, 10 to 60 mole percent methanol, 0.5 to 20 mole percent ethanol, 0.0 to 10 mole percent isopropanol, 1 to 10 mole percent acetic acid, 0.5 to 5 mole percent formic acid, 1 to 20 mole percent formaldehyde, 0 to 3 mole percent dimethoxymethane, 0 to 3 mole percent 1,1 dimethoxyethane, 0 to 3 mole percent methyl formate, 0 to 3 mole percent methyl acetate, and 20 to 60 mole percent water.

5. The method of claim 1 wherein the first mixture is formed by reacting a hydrocarbon-containing gas including $C_{1-5}$ hydrocarbons with oxygen without using a catalyst.

6. The method of claim 5 wherein the hydrocarbon-containing gas includes a component selected from the group consisting of $H_2$, $CO_2$, CO, $N_2$, $H_2S$, $H_2O$, oxygenates, and combinations thereof.

7. The method of claim 1 wherein the acetals are formed by reactive distillation.

8. The method of claim 1 wherein the $C_{1-5}$ aldehydes and/or $C_{3-5}$ ketones are synthesized by oxidation or oxidative dehydrogenation of the $C_{1-5}$ alcohols in the third mixture.

9. The method of claim 1 wherein the $C_{1-5}$ aldehydes and/or $C_{3-5}$ ketones for acetal production are synthesized from alcohols and synthesis gas in a homologation reaction which creates aldehydes and/or alcohols.

10. The method of claim 9 wherein synthesis gas and methanol are reacted to produce acetaldehyde or ethanol, and higher alcohols going to $C_{n+1}$ aldehydes and alcohols.

11. The method of claim 8 wherein a portion of the $C_{1-5}$ aldehydes are synthesized from olefins derived from oxygenate to olefin technology.

12. The method of claim 11 wherein the $C_{1-5}$ aldehydes are synthesized from a hydroformylation reaction.

13. The method of claim 8 wherein $C_{2-4}$ alcohols are dehydrated to produce olefins.

14. The method of claim 1 wherein a portion of alcohols and polyols for acetal formation are synthesized from olefins derived from oxygenate to olefin technology using oxygentates in the second and third mixture.

15. The method of claim 1 wherein olefins synthesized via OTO or MTO are directly hydrated to form higher alcohols, which then react with aldehydes and/or ketones to form acetals.

16. The method of claim 1 wherein alcohol is synthesized by a hydroformylation reaction of an olefin to an aldehyde followed by a hydrogenation of the aldehyde to a primary alcohol.

17. The method of claim 1 wherein $C_{1-5}$ aldehydes are derived from an Aldol condensation of two lower aldehydes followed by a dehydration of an Aldol product to an unsaturated aldehyde, followed by a selective hydrogenation of a carbon-carbon double bond.

18. The method of claim 1 wherein a primary alcohol is formed by full hydrogenation of an unsaturated aldehyde.

19. The method of claim 1 wherein a secondary alcohol is formed by full hydrogenation of an unsaturated ketone produced by an Aldol condensation of an aldehyde and a ketone or a ketone and a ketone.

20. The method of claim 1 wherein a diol is formed via Aldol condensation followed by hydrogenation of an aldol product.

21. The method of claim 17 wherein a polyol is formed by further Aldol condensations.

22. The method of claim 1 wherein the additive is an ether or poly ether.

23. The method of claim 22 wherein the ether or polyether is bonded to a carbon in the alpha or beta position to a nitrate.

24. The method of claim 23 wherein this ether or poly ether contains at least one carbon bonded to a nitrate ester.

25. The method of claim 1 wherein the acetals are formed from a reaction of $C_1$-$C_4$ alcohols and glyoxal.

26. The method of claim 1 wherein the acetals have at least one nitrate functionality.

27. The method of claim 25 wherein the glyoxal is produced from glycol aldehyde.

28. The method of claim 27 wherein the glycol aldehyde is produced via condensation of formaldehyde or through hydroformylation of formaldehyde with synthesis gas.

29. The method of claim 1 wherein glycol aldehyde is hydrogenated to form ethylene glycol and reacted with $C_1$-$C_5$ aldehydes and ketones to produce dioxolane, dioxolane analogs formed by higher aldehydes and ketones, and acetals with at least 1 common $C_2$ linkage.

30. The method of claim 1 wherein the additive is a compound such that peroxide inhibition and ignition enhancement occur on a same molecule via an Aldol reaction of a nitro-alkane on an aldehyde.

31. The method of claim 1 wherein an acetal blend includes processed $C_{1-2}$ alcohols.

32. The method of claim 1 where two $C_1$-$C_5$ carboxylic acids separated from the first mixture are reacted to produce aldehydes or ketones of one carbon less than the sum of carbon atoms in of the two $C_1$-$C_5$ carboxylic acids, where the aldehydes or ketones react with alcohols or polyols to form acetals.

33. The method of claim 1 where $C_1$-$C_5$ acetals are oxidized to $C_1$ to $C_3$ aldehydes.

34. The method of claim 1 wherein the first mixture of oxygenates further includes $C_{1-5}$ aldehydes and $C_{1-5}$ ketones.

35. The method of claim 34 wherein the first mixture of oxygenates further includes $C_{1-5}$ organic acids.

36. The method of claim 1 wherein $C_{2-5}$ alcohols are also synthesized in step d) from the $C_{1-5}$ alcohols in a portion of the third mixture.

37. The method of claim 36 wherein $C_{2-5}$ polyols are also synthesized in step d) from the $C_{1-5}$ alcohols in a portion of the third mixture.

* * * * *

UNITED STATES PATENT AND TRADEMARK OFFICE
CERTIFICATE OF CORRECTION

PATENT NO.         : 10,590,357 B2
APPLICATION NO.    : 15/428506
DATED              : March 17, 2020
INVENTOR(S)        : Ian Lawrence Gaffney et al.

It is certified that error appears in the above-identified patent and that said Letters Patent is hereby corrected as shown below:

In the Claims

Column 16, Lines 32-33, Claim 1:
After "the group consisting of",
Delete "including".

Column 16, Lines 59-60, Claim 3:
After "the first mixture",
Delete "includes".

Column 17, Line 33-34, Claim 14:
After "technology using",
Delete "oxygentates" and
Insert -- oxygenates --.

Column 18, Line 36, Claim 32:
After "less than the sum of carbon atoms",
Delete "in of" and
Insert -- in one of --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*